United States Patent
Urbanczyk

[19]
[11] Patent Number: 5,887,845
[45] Date of Patent: Mar. 30, 1999

[54] UNIVERSAL MOUNTING ASSEMBLY

[75] Inventor: Marvin L. Urbanczyk, White Deer, Tex.

[73] Assignee: Scarab Manufacturing & Leasing, Inc., White Deer, Tex.

[21] Appl. No.: 841,346

[22] Filed: Apr. 30, 1997

[51] Int. Cl.⁶ .................................................. F16M 1/00
[52] U.S. Cl. .................................... 248/637; 248/675
[58] Field of Search .................... 248/637, 638, 248/674, 675

[56] References Cited

U.S. PATENT DOCUMENTS

| | | | |
|---|---|---|---|
| 1,733,379 | 10/1929 | Lowy | 198/788 |
| 1,811,394 | 6/1931 | Hornsby | 180/19.3 |
| 2,175,860 | 10/1939 | Waimann | 198/788 |
| 2,827,777 | 9/1958 | Molyneux et al. | 464/106 |
| 3,179,016 | 4/1965 | Thornton-Trump | 91/55 |
| 3,235,206 | 2/1966 | Luketa | 248/637 |
| 3,333,801 | 8/1967 | Falk | 248/637 |
| 3,528,114 | 9/1970 | Gies et al. | 60/469 |
| 3,568,821 | 3/1971 | Gronkvist | 198/127 |
| 3,932,076 | 1/1976 | Thibault | 449/177 |
| 4,013,166 | 3/1977 | Weady et al. | 198/835 |
| 4,171,732 | 10/1979 | Pinson | 180/308 |
| 4,253,807 | 3/1981 | Pahl | 418/61 B |
| 4,340,320 | 7/1982 | Moss | 404/122 |
| 4,422,334 | 12/1983 | Yasuda | 73/665 |
| 4,583,425 | 4/1986 | Mann et al. | 74/730 |
| 4,700,613 | 10/1987 | Tiljander | 91/485 |
| 4,804,291 | 2/1989 | Everett | 403/287 |
| 5,062,730 | 11/1991 | Tomii et al. | 403/577 |
| 5,088,596 | 2/1992 | Agnoff | 198/788 |
| 5,383,645 | 1/1995 | Pedut et al. | 248/637 |
| 5,413,209 | 5/1995 | Werner | 198/500 |
| 5,752,688 | 5/1998 | Campbell et al. | 248/674 |

Primary Examiner—Leslie A. Braun
Assistant Examiner—Gwendolyn Baxter
Attorney, Agent, or Firm—Birch, Stewart, Kolasch & Birch, LLP

[57] ABSTRACT

A universal mounting assembly having bearings at predetermined locations supports motors mounted inside or outside a rotating cylinder. The universal mounting assembly through the bearings absorbs stresses exerted on both the rotating cylinder and the stationary motor shaft. When the motor is mounted in the cylinder, the cylinder protects the motor from external environmental elements which are corrosive to the motor. The universal mounting assembly provides a motor mounting assembly which is more compact and which does not interfere with the wheels of a compost vehicle support frame. The universal mounting assembly provides a motor mounting which reduces labor in assembly/disassembly of the motor mounting where the motor energy supply conduits are placed in optimal locations for easy repair/replacement.

36 Claims, 10 Drawing Sheets

UNIVERSAL MOUNTING ASSEMBLY

BACKGROUND OF THE INVENTION

1. Field of the Invention

The present invention generally relates to a universal mounting assembly for a rotating cylinder of a compost vehicle. The universal assembly has a motor mounted within the rotating cylinder.

2. Description of the Background

Various motors mounted externally of compost vehicle cylinders are known in the art. These motors mounted external to the rotating cylinder increase the size of the compost vehicle and interfere with the wheels of the vehicle support frame of the machine. The external mounted motors are also subjected to corrosive environmental elements such as rain, mud, and sand, etc. Motors mounted in cylinders are known in the conventional art for rotating the cylinders. In environments where external stresses are exerted on the rotated cylinder such as in compost vehicles, the stresses are transmitted to the stationary motor shaft and cause fracture of the shaft.

Accordingly, a need in the art exists for a universal mounting assembly which can absorb these stresses exerted on a stationary shaft of a motor mounted in a rotating cylinder. Furthermore, a need exists in the art to provide a dynamic mounting assembly which can accommodate different types of motors having various energy supply conduits which are external to both the rotating cylinder and the mounting assembly.

SUMMARY OF THE INVENTION

Accordingly, it is primary object of the present invention to provide a universal mounting assembly which supports a motor mounted inside a rotating cylinder where the universal mounting assembly absorbs stresses exerted on both the rotating cylinder and the stationary motor shaft.

It is additionally a further object of the present invention to protect a motor from external environmental elements which are corrosive to the motor.

It is a further object to provide a motor mounting assembly which is more compact and which does not interfere with the wheels of a support frame.

Another object of the present invention is to provide a motor mounting which reduces labor in assembly/disassembly of the motor mounting where the motor energy supply conduits are placed in optimal locations for easy repair/replacement.

These and other objects of the present invention are fulfilled by providing a universal mounting assembly comprising at least two frame mounting plates, each frame mounting plate including at least one set of primary bearings; at least two inner support plates, each inner support plate being at least partially enclosed by at least one of the frame mounting plates, each inner support plate having at least two shafts aligned in a first substantially parallel direction and rotatably mounted on one set of the primary bearings, each inner support plate having at least one set of secondary bearings aligned in a second direction substantially perpendicular to the first parallel direction; a rotatably mounted cylinder having two ends; at least two cylinder support plates, each cylinder support plates being attached to one of the respective ends of the cylinder, each cylinder support plate being at least partially enclosed by at least one of the inner support plates, each cylinder support plate having at least two shafts aligned in the second direction and rotatably mounted on at least one set of the secondary bearings, wherein stresses exerted on the cylinder are absorbed by each bearing.

Moreover, these and other objects of the present invention are fulfilled by providing a universal mounting assembly comprising at least one frame mounting plate, each frame mounting plate including at least one set of primary bearings; at least one inner support plate, each inner support plate being at least partially enclosed by at least one the frame mounting plate, each inner support plate having at least two shafts aligned in a first substantially parallel direction and rotatably mounted on one set of the primary bearings, each inner support plate having at least one set of secondary bearings aligned in a second direction substantially perpendicular to the first parallel direction; at least one rotatably mounted cylinder having two ends; at least one cylinder support plate, each cylinder support plate being attached to one of the respective ends of the cylinder, each cylinder support plate being at least partially enclosed by at least one inner support plate, each cylinder support plate having at least two shafts aligned in the second direction and rotatably mounted on at least one set of the secondary bearings; at least one shaft connected to the cylinder, the shaft having first and second ends; and at least one bearing mounted to the second end of the shaft, wherein stresses exerted on the cylinder are absorbed by each bearing.

In addition, these and other objects of the present invention are also accomplished by a mounting assembly comprising a rotatably mounted cylinder having two ends; at least one motor mounted in the cylinder for rotating the cylinder and attached to at least one cylinder support plate; at least two cylinder support plates, each cylinder support plate being attached to one of the respective ends of the cylinder, each cylinder support plate having at least two shafts rotatably mounted on at least one set of bearings, each cylinder support plate having at least one motor energy supply passage defining two motor energy supply holes, one motor energy supply hole being on a first surface of the cylinder support plate facing the motor and one motor energy supply hole being on a second surface of the cylinder support plate opposite of the motor, the motor energy supply holes providing two separate central axes of the passage which are substantially parallely aligned, wherein the cylinder protects the motor and the locations of the motor energy supply holes reduce labor in attaching the motor to the cylinder support plate.

Additionally, these and other objects of the present invention are fulfilled by a method of absorbing stresses of a rotating cylinder comprising the steps of supporting a cylinder by a universal mounting assembly, the universal mounting assembly providing a plurality of bearings; rotating the cylinder by at least one motor connected to the universal mounting assembly by a cylinder support plate; and moving the cylinder by the bearings to absorb stresses exerted on the cylinder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of t present invention, and wherein.

DETAILED DESCRIPTION OF THE PREFERRED EMBODIMENTS

Figure 1:
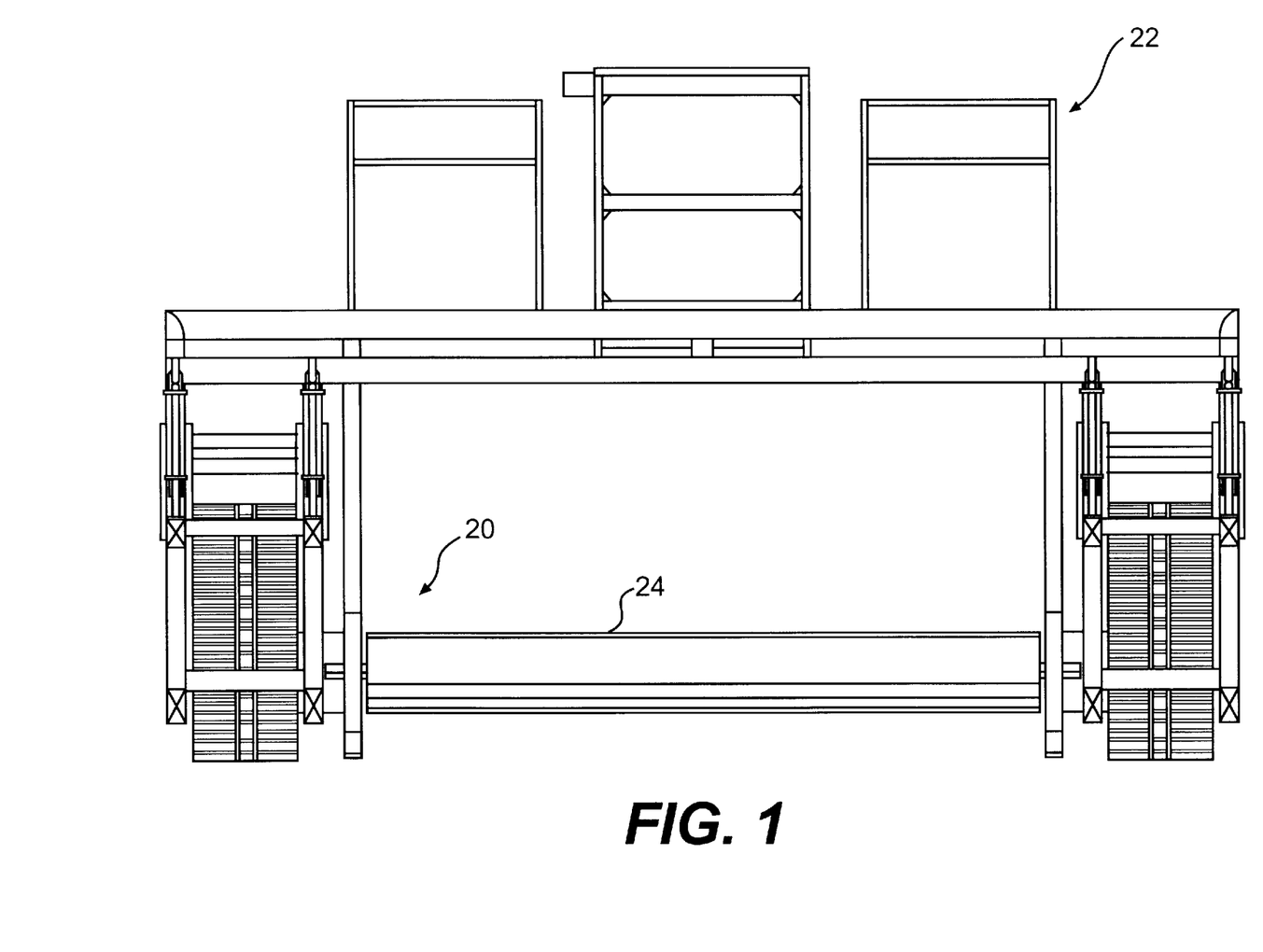
FIG. 1 shows a front view of the universal mounting assembly in a compost vehicle.
Figure 2:
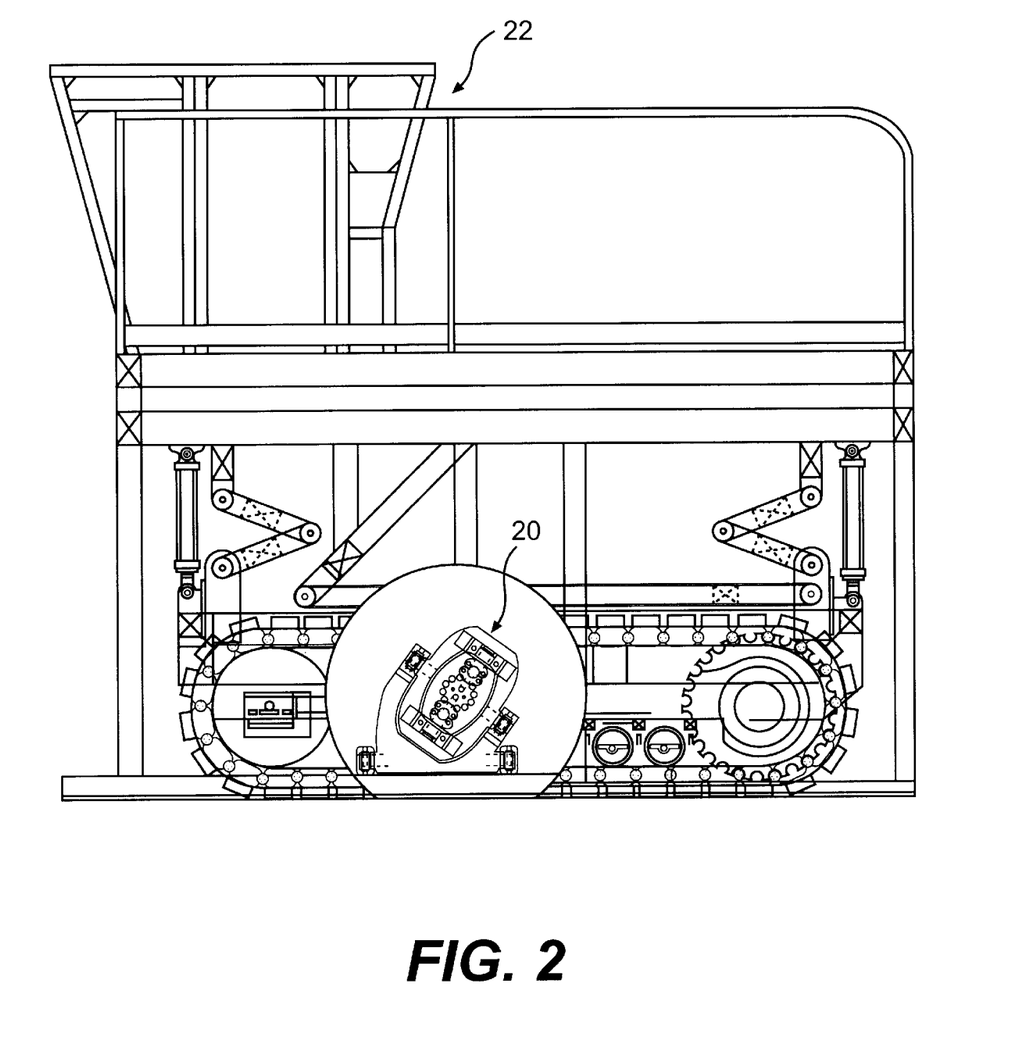
FIG. 2 shows a side view of the universal mounting assembly in the compost vehicle.

Referring in detailed to the drawings and with particular reference to FIG. 1, a universal mounting assembly 20 is shown in a compost vehicle 22. The universal mounting assembly for a rotating cylinder 24 can be used in other machines such as asphalt compacting machines having rotating drums, or large movable conveyers having rotating rollers. It is contemplated that the universal mounting assembly will be used with a compost treating vehicle where the universal mounting assembly is attached to a frame of the compost treating vehicle. The cylinder is rotatable about a generally horizontal axis relative to the compost treating vehicle to agitate or disintegrate compost windrows.

Figure 3A:
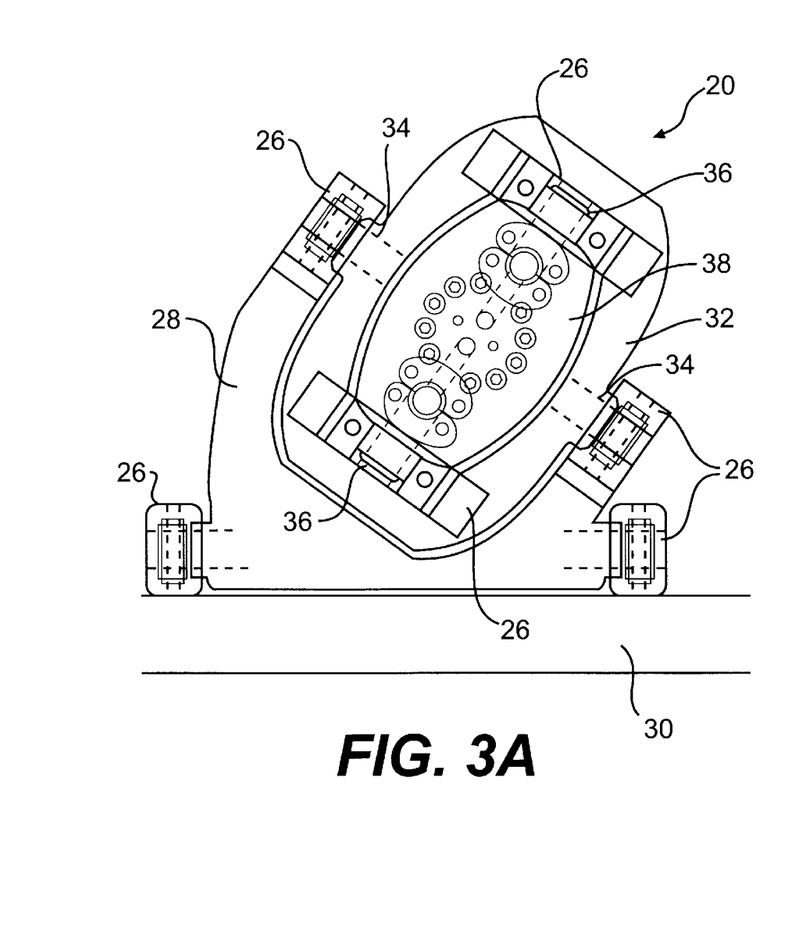
FIG. 3A shows one side of the universal mounting assembly of the present invention.
Figure 3B:
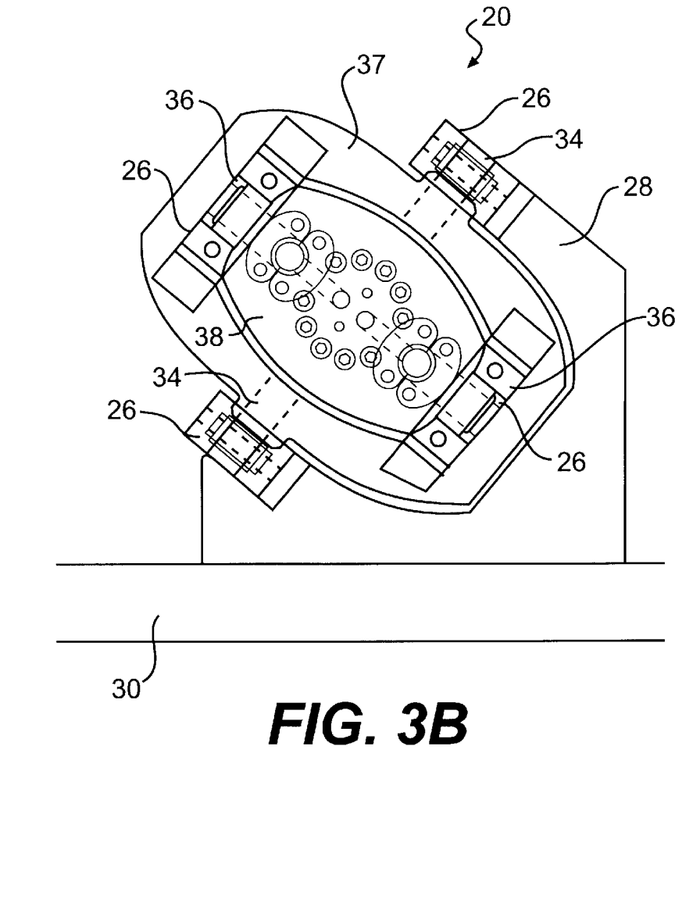
FIG. 3B shows another side of the universal mounting assembly of the present invention
Figure 4:
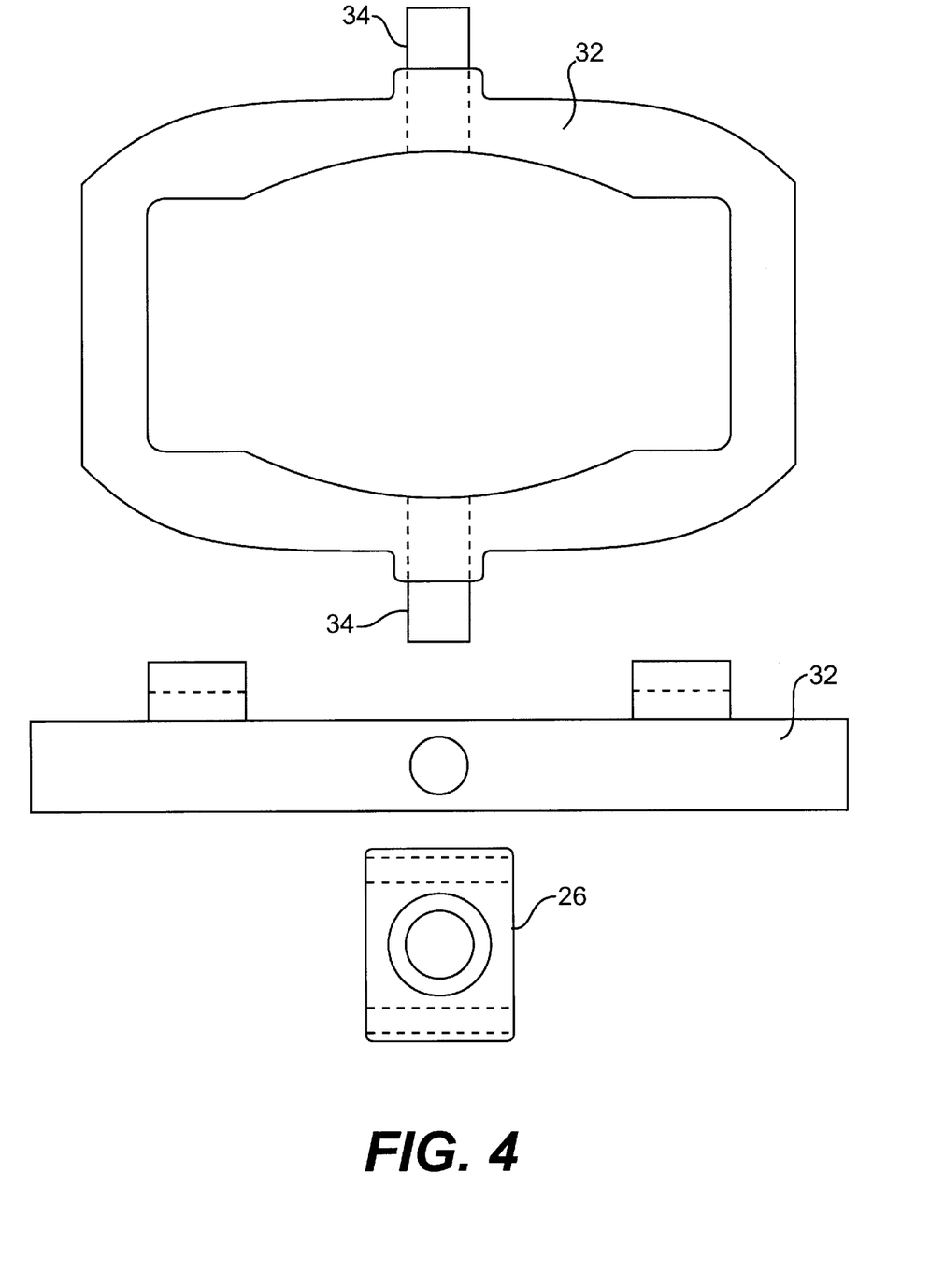
FIG. 4 shows an inner support plate of the universal mounting assembly.

As seen in FIGS. 3A–B, the universal mounting assembly employs a plurality of bearings 26. A frame mounting plate 28 is attached to a frame 30 preferably by welds but other attachment devices such as bolts or rivets used with flanges or the like can be employed. The frame mounting plate 28 rotatably supports an inner support plate 32 by bearings 26 and a first set of shafts 34 shown by dotted lines. The inner support plate 32 has a second set of shafts 36 retained by bearings 26. The second set of shafts 36 are aligned in a direction substantially perpendicular to an alignment direction of the first set of shafts 34. The first set of shafts rotatably support a cylinder support plate 38. It is further noted that frame mounting plate 28 has generally a U-shape. The mounting plate 28, inner support plate 32, and cylinder support plate 38 are not limited to the shapes shown in the drawings. Other shapes include but are not limited to round, square, rectangular, elliptical, pentagonal, octagonal or any polygonal shapes.

It is noted that the U-shaped frame mounting plate 28 is oriented substantially 36° relative to a vertical axis in the first embodiment. The bearings 26 are preferably spherical bearings but other bearings such as expansion pillow bearings or tapered roller bearings or journal bearings or the like may be employed.

Figure 5A:
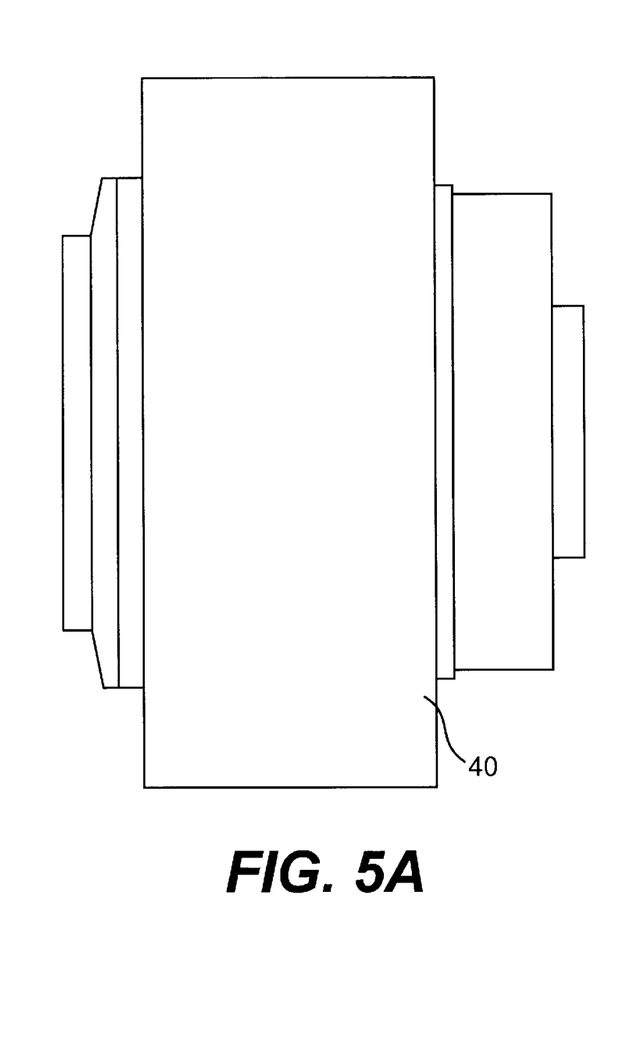
FIG. 5A shows the motor.
Figure 5B:
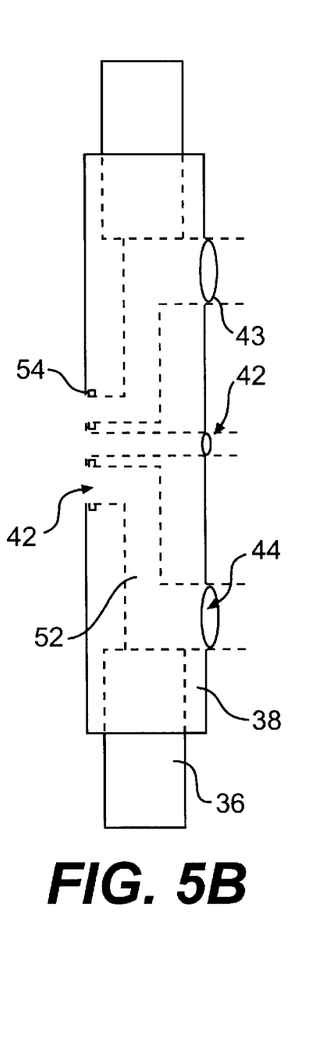
FIG. 5B shows the front view of the cylinder support plate of the present invention.
Figure 5C:
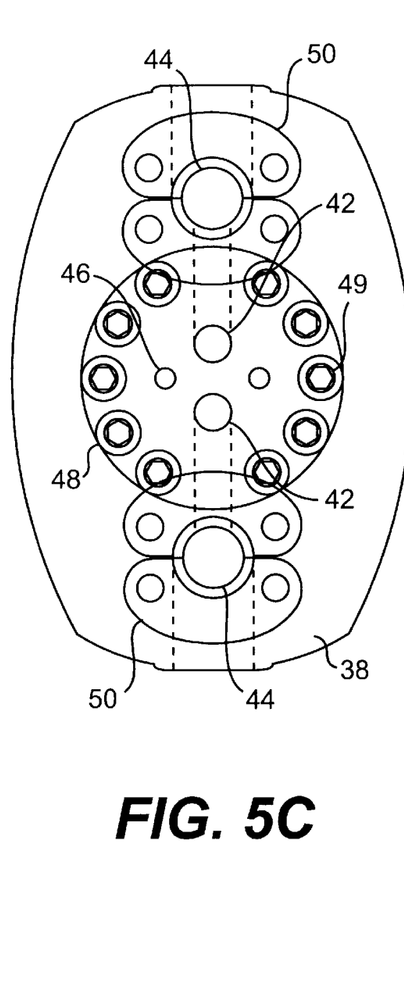
FIG. 5C shows the side view of the cylinder support plate the present invention.
Figure 7:
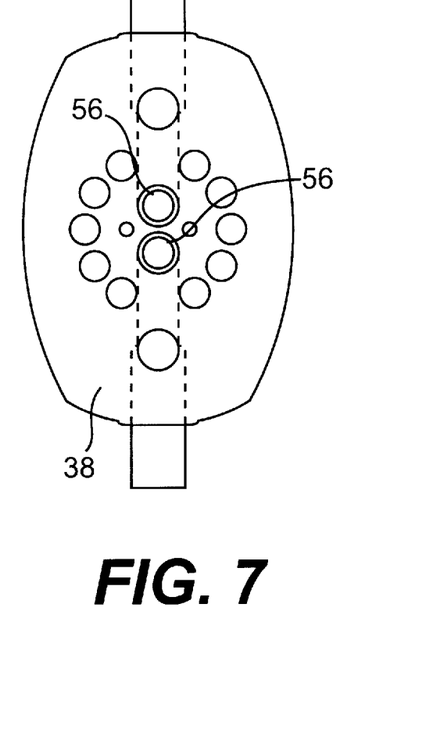
FIG. 7 shows an internal view of the cylinder support plates the present invention.

In FIGS. 5A–C, a motor 40 is shown with the cylinder support plate 38. Cylinder support plate 38 provides a plurality of motor energy supply holes 42, 44. The cylinder support plate further provides a plurality of heat transfer holes 46 and a plurality of fastener holes 48. The motor energy supply holes 42 are located on a first surface of the cylinder support plate 38 facing the motor 40. The motor energy supply holes 44 are located on a second surface of the cylinder support plate 38 facing opposite the motor 40. The cylinder support plate 38 further provides an attachment surface for split flange O-ring fittings 50. Motor energy supply holes 42, 44 penetrate through substantially two-thirds through the cylinder support plate 38. The motor energy supply holes 42, 44 are connected together by motor energy supply passages 52. The heat transfer holes 46 and fastener holes 48 penetrate completely through the cylinder support plate 38. The cylinder support plate 38 on the first surface also provides counter-bores 54 for O-rings 56 (see FIG. 7).

Figure 6:
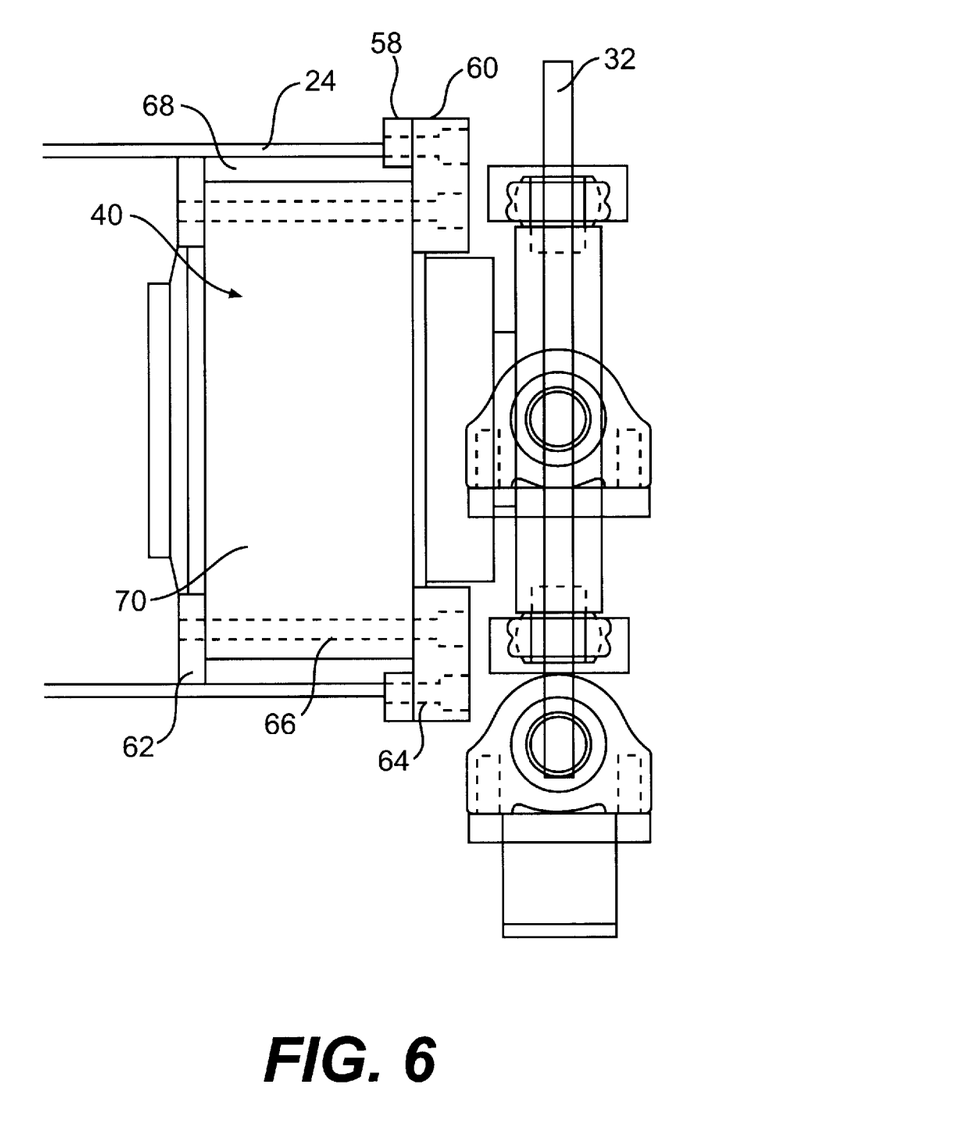
FIG. 6 shows a front view of the universal mounting assembly of the present invention.

In FIG. 6, the motor 40 is supported by a first ring mounting plate 58, a second ring mounting plate 60, a third ring mounting plate 62, and the cylinder support plate 38. Fastener holes 64 penetrate through both the first ring mounting plate 58 and the second ring mounting plate 60. The first ring mounting plate is preferably welded to cylinder 24, but other attachment devices such as bolts or rivets used with flanges or the like may be employed. Fastener holes 66 penetrate through the second ring mounting plate 60, the motor 40, and the third ring mounting plate 62. It is noted that fastener hole 66 passes through the stationary shaft 70 of the motor 40. This permits the case 68 of the motor 40 to rotate with the cylinder 24. The fastener holes 48 provide connections between the cylinder support plate 38 and the stationary motor shaft 70. The fasteners 49 are preferably bolts, but other fasteners such as screws, rivets or the like may be employed. The motor energy supply conduits 43 and the heat transfer conduits 47 are preferably flexible rubber hoses, but other hoses made of metal or the like may be employed. It is noted that the motor energy supply conduits could also be electrical wires. The motor 40 is preferably a hydraulic rotating case motor, but other motors such as electrical motors or the like may be employed.

Figure 8:
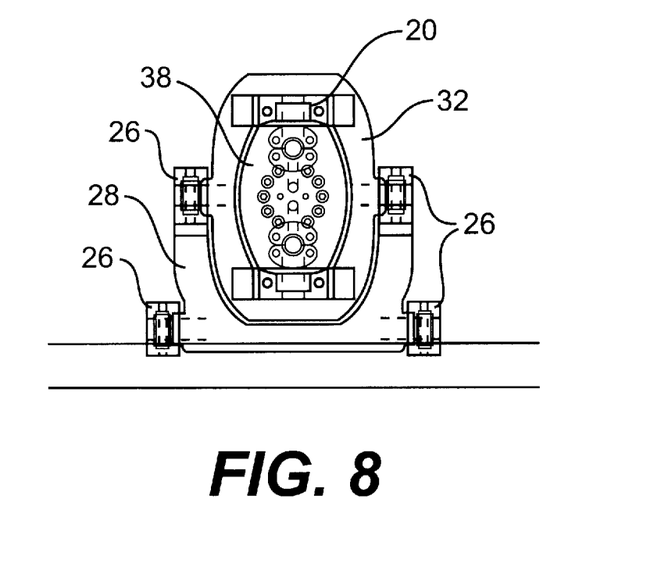
FIG. 8 shows a side view of a second embodiment of the present invention.

In FIG. 8, a second preferred embodiment is shown where the frame mounting plate 28 is oriented along a vertical axis. Similar reference numerals are used to designate like structures of the first embodiment.

Figure 9A:
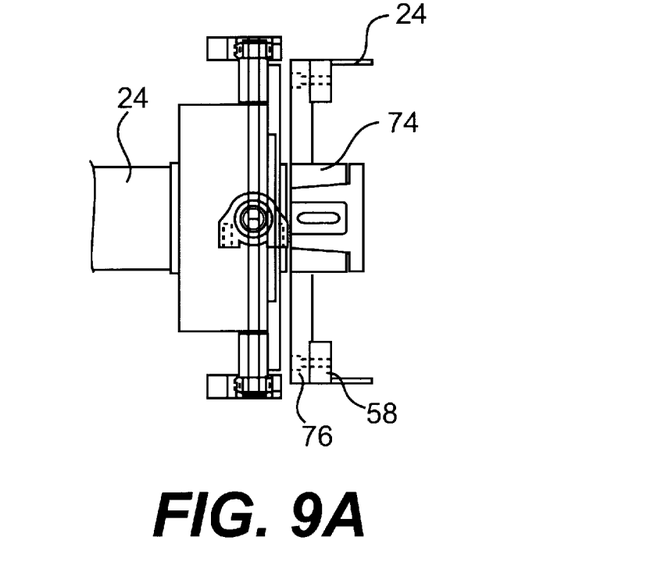
FIG. 9A a front view of a third embodiment of the present invention.
Figure 9B:
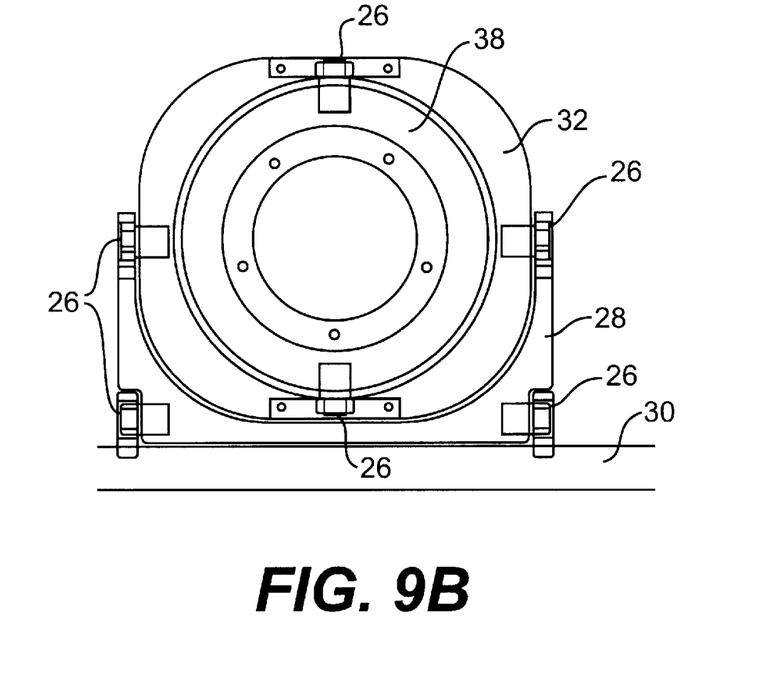
FIG. 9B shows a side view of a third embodiment of the present invention.

In FIGS. 9A–B, a rotating shaft motor 72 is mounted external to the cylinder 24. Rotating shaft 74 of the motor is connected to large ring mounting plate 76. In this embodiment, the cylinder support plate 38 has a generally round shape while the U-shaped frame mounting plate 28 is oriented in generally a perpendicular manner. The inner support plate 32 has generally a square shape for this embodiment. Of course, any suitable shaped plate could be employed.

Figure 10:
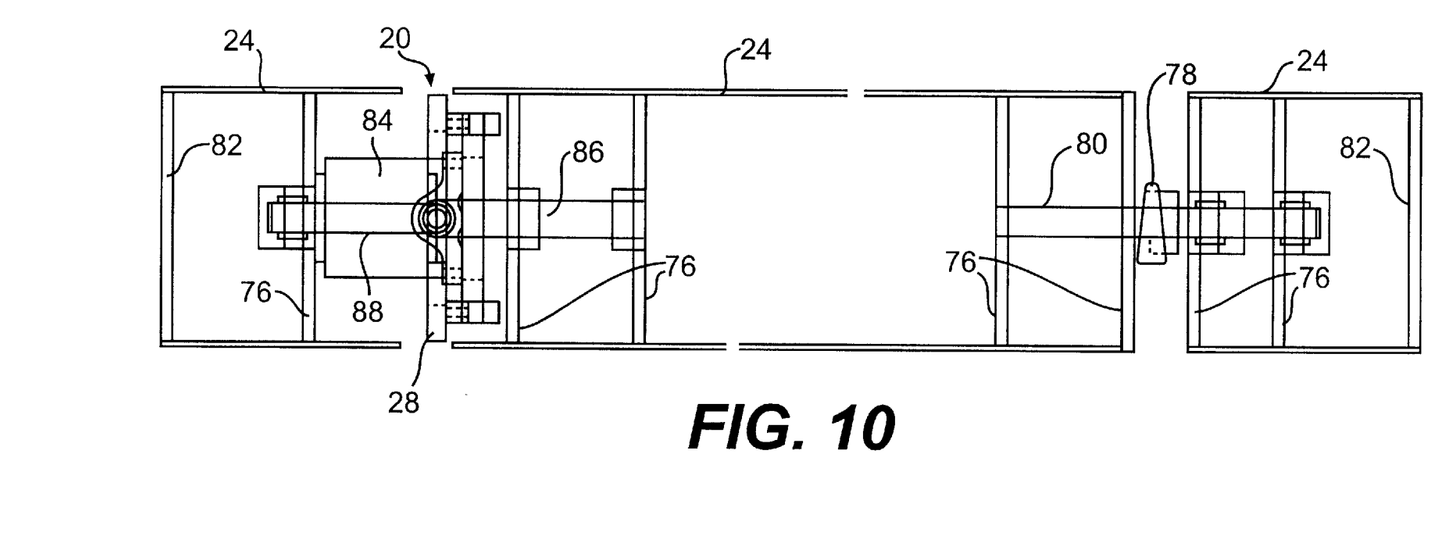
FIG. 10 shows a front view of a fourth embodiment of present invention.

In FIG. 10, a fourth embodiment of the present invention is shown where the universal mounting assembly employs one frame mounting plate 28 on one end of a first rotating cylinder 24 and a bearing 78 located on a second end of the rotating cylinder 24. The bearing 78 is preferably an expansion pillow bearing but other bearings such as non-expansion pillow bearings or tapered roller bearings or journal bearings or the like may be employed. The bearing 78 supports a shaft 80. The shaft 80 is preferably hollow but solid shafts can be employed. The shaft 80 is attached to the large ring mounting plate 76 by welds but other attachment devices such as bolts or rivets used with flanges or the like can be employed. The large ring mounting plates 76 are preferably welded to the rotating cylinder 24 but other attachment devices such as bolts or rivets used with flanges or the like can be employed. The shaft 80 further supports another rotating cylinder 24 by ring mounting plates 76. End plates 82 provide closing structures to the hollow cylinders 24 located on respective sides of the embodiment shown in FIG. 10.

A hollow shaft motor 84 is mounted to a frame mounting plate 28 and rotates hollow shafts 86 and 88. The embodiment shown in FIG. 10 is preferably employed in an industrial sized container system (not shown) for agitating or disintegrating compost material which is present in the large container. The entire assembly of FIG. 10 is supported by a compost machine attached to the sides of the container. The entire assembly of FIG. 10 is lowered into the container to disintegrate or agitate the compost material.

Figure 11:
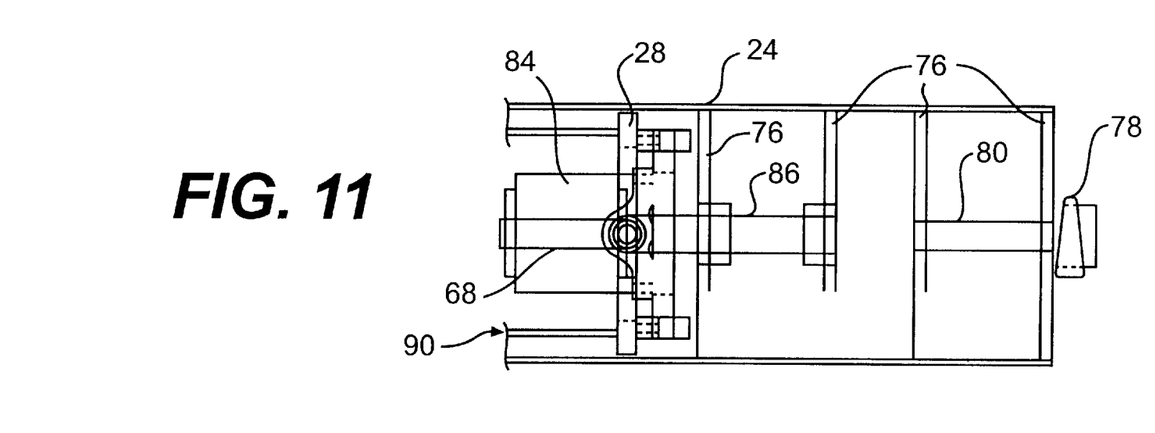
FIG. 11 shows a front view of a fifth embodiment of e present invention.
Figure 12:
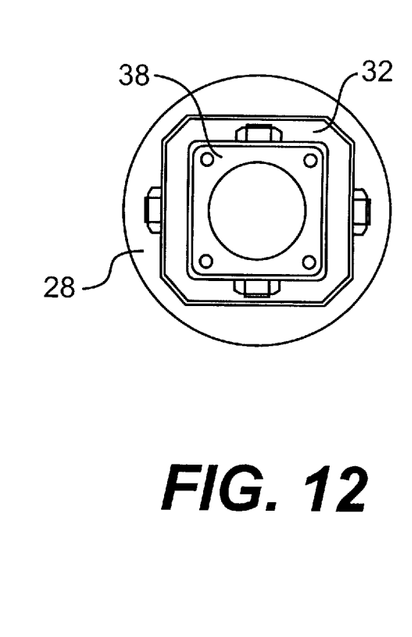
FIG. 12 shows side view of the fifth embodiment of the resent invention.

In FIGS. 11–12, a fifth embodiment of the present invention is shown where the hollow shaft motor 84 is supported by a mounting pipe 90. The frame mounting plate 28 is preferably welded to the mounting pipe 90 but other attachment devices such as bolts or rivets used with flanges or the like can be employed. The embodiment in FIG. 11 rotates a single cylinder 24 by the hollow shaft motor 84. FIG. 12 shows a side view of the embodiment shown in FIG. 11. As seen in FIG. 12, the frame mounting plate 28 is generally round in shape while both the inner support plate 32 and the cylinder support plate 38 have generally a square shape. As mentioned above, the frame mounting plate 28, the inner support plate 32, and the cylinder support plate 38 are not limited to the shapes disclosed in the drawings. Other shapes include but are not limited to round, square, rectangular, elliptical, pentagonal, octagonal, or any polygonal shapes.

Figure 13:
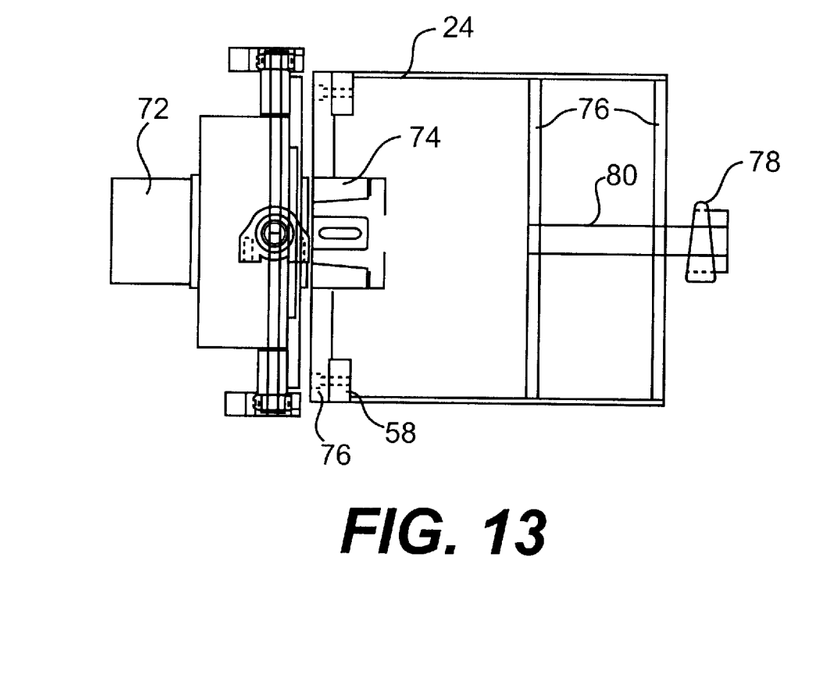
FIG. 13 Shows a front view of a sixth embodiment of the present invention.

In FIG. 13, a sixth preferred embodiment is shown where the rotating shaft motor is disposed on one end of the cylinder 24 and a bearing 78 is disposed on the other end. Similar to the embodiments shown in FIGS. 10–13, a shaft 80 supports one end of the rotating cylinder 24 by large ring mounting plates 76.

The universal mounting assembly of each embodiment provides a method for supporting the cylinder 24 and for rotating the cylinder by at least one motor. The method provides steps for moving the cylinder by the bearings which absorb stresses exerted on the cylinder 24. The method further comprises a step of pivoting the universal assembly so that the cylinder is moveable in both vertical and horizontal directions relative to the universal mounting assembly. The method further comprises the steps of using the cylinder in a compost vehicle; driving the compost vehicle to a windrow of compost; and moving and rotating the cylinder along a length of the windrow of compost through an interior of the compost vehicle to agitate or disintegrate the compost windrow.

With this universal mounting assembly 20, the motor which rotates the cylinder is relieved of any stresses from the vehicle frame or compost that are exerted on the cylinder. Damage to the shaft of the rotating motor is avoided. The universal mounting assembly with a motor provided inside the cylinder 24 provides a device which is more compact and which does not interfere with the wheels of a support frame. The mounting assembly further aids in reducing the labor in assembling/disassembling the motor mounting where the motor energy supply conduits are placed in optimal locations for easy repair/replacement.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A universal mounting assembly comprising:
    at least two frame mounting plates, each frame mounting plate including at least one set of primary bearings;
    at least two inner support plates, each inner support plate being at least partially enclosed by at least one of said frame mounting plates, each said inner support plate having at least two shafts aligned in a first substantially parallel direction and rotatably mounted on one set of said primary bearings, each said inner support plate having at least one set of secondary bearings aligned in a second direction substantially perpendicular to the first parallel direction;
    a rotatably mounted cylinder having two ends; and
    at least two cylinder support plates, each cylinder support plate being attached to one of the respective ends of the cylinder, each said cylinder support plate being at least partially enclosed by at least one of the inner support plates, each said cylinder support plate having at least two shafts aligned in said second direction and rotatably mounted on at least one set of said secondary bearings, wherein stresses exerted on said cylinder are absorbed by each bearing.

2. The universal mounting assembly of claim 1, further comprising:
    at least one motor mounted in said cylinder for rotating said cylinder and attached to said least one cylinder support plate, wherein said motor is protected by said cylinder.

3. The universal mounting assembly of claim 2, wherein a surface of each cylinder said support plate that is opposite to a surface facing the motor has at least one motor energy supply hole, at least one heat transfer hole, and at least one fastener hole, said heat transfer hole being located near a central portion of said cylinder support plate, and said fastener hole being disposed between said motor energy supply hole and said heat transfer hole.

4. The universal mounting assembly of claim 3, wherein said motor energy supply hole communicates with at least one energy supply conduit, said heat transfer hole communicates with said at least one heat transfer conduit, and said fastener hole communicates with at least one fastener.

5. The universal mounting assembly of claim 3, wherein a surface of each said cylinder support plate facing the motor has said at least one motor energy hole, said at least one heat transfer hole, and said at least one fastener hole, said motor energy hole and said heat transfer hole being located near said central portion of said cylinder support plate, and said fastener hole being disposed in a portion outside of the central portion and both said motor energy hole and heat transfer hole.

6. The universal mounting assembly of claim 5, wherein said motor energy supply hole communicates with at least one energy supply port of said motor, and said fastener hole supports at least one fastener.

7. The universal mounting assembly of claim 5, wherein said motor energy supply hole on the side facing the motor has a counter bore and at least one ring sealing member, and said heat transfer hole has a counter bore and at least one ring sealing member.

8. The universal mounting assembly of claim 1, further comprising:
said least one motor mounted outside said cylinder for rotating said cylinder and attached to at least one cylinder support plate.

9. The universal mounting assembly of claim 1, wherein each frame mounting plate is generally U-shaped.

10. The universal mounting assembly of claim 9, wherein each said frame mounting plate is oriented at an angle other than the normal of a geometric plane of a frame mounting plate attachment surface.

11. The universal mounting assembly of claim 1, wherein each said inner support plate is one of a round, square, rectangular, elliptical, and polygonal shape.

12. The universal mounting assembly of claim 1, wherein each said cylinder support plate is one of a round, square, rectangular, elliptical shape, and polygonal shape.

13. The universal mounting assembly of claim 1, wherein said at least one frame mounting plate includes a second set of primary bearings mounted on a base portion of said frame mounting plate.

14. The universal mounting assembly of claim 1, wherein the universal mounting assembly is attached to a compost treating vehicle and wherein the cylinder is rotatable about a generally horizontal axis to agitate or disintegrate compost windrows.

15. A mounting assembly comprising:
a rotatably mounted cylinder having two ends;
at least one motor mounted in said cylinder for rotating said cylinder and attached to at least one of two cylinder support plates;
each cylinder support plate being attached to one of the respective ends of said cylinder, each said cylinder support plate having at least two shafts rotatably mounted on at least one set of bearings, each cylinder support plate having at least one motor energy supply passage defining two motor energy supply holes, one motor energy supply hole being on a first surface of said cylinder support plate facing said motor and one motor energy supply hole being on a second surface of said cylinder support plate opposite of said motor, said motor energy supply holes providing two separate central axes of said passage which are substantially parallely aligned, wherein said cylinder protects said motor and the locations of said motor energy supply holes reduce labor in attaching the motor to said cylinder support plate.

16. The mounting assembly of claim 15, wherein on said second surface has at least one heat transfer hole, and at least one fastener hole, said heat transfer hole being located near a central portion of said cylinder support plate, and said fastener hole being disposed between said motor energy supply hole of said first surface and said heat transfer hole.

17. The mounting assembly of claim 16, wherein said first surface has at least one heat transfer hole, and at least one fastener hole, said motor energy hole on said first surface and said heat transfer hole being located near said central portion of said cylinder support plate, and said fastener hole being disposed in a portion outside of the central portion and both said motor energy supply hole and heat transfer hole.

18. The mounting assembly of claim 17, wherein said motor energy supply hole communicates with at least one energy supply port of said motor, and said fastener hole supports at least one fastener.

19. The mounting assembly of claim 15, wherein said motor energy supply hole communicates with at least one energy supply conduit, said heat transfer hole communicates with at least one heat transfer conduit, and said fastener hole supports at least one fastener.

20. The mounting assembly of claim 15, wherein said motor energy supply hole on said first surface has a counter bore for at least one ring sealing member, and said heat transfer hole has a counter bore for at least one ring sealing member.

21. The mounting assembly of claim 15, further comprising:
at least two first ring mounting plates, each first ring attached to one of the respective ends of said cylinder, at least two second ring mounting plates, each second ring mounting plate attached to the one motor and said first ring mounting plates at least one third mounting ring inside said cylinder and attached to said motor.

22. The mounting assembly of claim 15, wherein said at least one motor is a hydraulic rotating case motor.

23. The mounting assembly of claim 15, wherein the mounting assembly is attached to a compost treating vehicle and wherein the cylinder is rotatable about a generally horizontal axis to agitate or disintegrate compost windrows.

24. A method of absorbing stresses of a rotating cylinder comprising the steps of:
supporting a cylinder by a universal mounting assembly, said universal mounting assembly providing a plurality of bearings;
rotating said cylinder by at least one motor connected to said universal mounting assembly by a cylinder support plate; and
moving said cylinder by said bearings to absorb stresses exerted on said cylinder.

25. The method of claim 24, wherein the step of moving further comprises pivoting the universal assembly so that the cylinder is moveable in both vertical and horizontal directions relative to the universal mounting assembly.

26. The method of claim 24, further comprising the steps of:
using the cylinder in a compost vehicle;
driving the compost vehicle to a windrow of compost; and
moving and rotating the cylinder along a length of the windrow of compost through an interior of the compost vehicle to agitate or disintegrate the compost windrow.

27. A universal mounting assembly comprising:
at least one frame mounting plate, each frame mounting plate including at least one set of primary bearings;
at least one inner support plate, each inner support plate being at least partially enclosed by at least one said frame mounting plate, each said inner support plate having at least two shafts aligned in a first substantially parallel direction and rotatably mounted on one set of said primary bearings, each inner support plate having at least one set of secondary bearings aligned in a second direction substantially perpendicular to said first parallel direction;
at least one rotatably mounted cylinder having two ends;
at least one cylinder support plate, each cylinder support plate being attached to one of the respective ends of said cylinder, each said cylinder support plate being at least partially enclosed by at least one inner support plate, each cylinder support plate having at least two shafts aligned in said second direction and rotatably mounted on at least one set of said secondary bearings;

at least one shaft connected to each said cylinder, said shaft having first and second ends; and at least one bearing mounted to said second end of said shaft, wherein stresses exerted on said cylinder are absorbed by each bearing.

28. The universal mounting assembly of claim 27, further comprising:

at least one motor for rotating said cylinder being attached to said at least one cylinder support plate and said first end of said shaft.

29. The universal mounting assembly of claim 28, further comprising:

a first shaft and a second shaft for rotating said at least one cylinder, said first shaft connected to said motor, said second shaft connected to said at least one bearing, and said at least one motor being a hollow shaft motor.

30. The universal mounting assembly of claim 28, wherein said at least one motor is a rotating shaft motor.

31. The universal mounting assembly of claim 29, further comprising:

a mounting cylinder for supporting said frame mounting plate, said at least one motor being mounted in said at least one cylinder and said mounting cylinder.

32. The universal mounting assembly of claim 29, further comprising:

a third shaft; and first, second, and third cylinders, said first shaft rotating said first cylinder, second shaft rotating said first and second cylinders, and said third shaft rotating said third cylinder.

33. The universal mounting assembly of claim 27, wherein each frame mounting plate is one of a U, round, square, elliptical, and polygonal shape.

34. The universal mounting assembly of claim 27, wherein each inner support plate is one of a round, square, elliptical, and polygonal shape.

35. The universal mounting assembly of claim 27, wherein each said cylinder support plate is one of a round, square, elliptical, and polygonal shape.

36. The universal mounting assembly of claim 27, wherein the universal mounting assembly is attached to a compost treating vehicle and wherein the cylinder is rotatable about a generally horizontal axis to agitate or disintegrate compost windrows.

* * * * *